(12) United States Patent
Zhang et al.

(10) Patent No.: US 12,349,075 B2
(45) Date of Patent: Jul. 1, 2025

(54) PATH LOSS REFERENCE SIGNAL (PL RS) APPLICATION TIME

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Sony Akkarakaran, Poway, CA (US); Konstantinos Dimou, New York City, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/758,375

(22) PCT Filed: Nov. 20, 2020

(86) PCT No.: PCT/US2020/061638
§ 371 (c)(1),
(2) Date: Jul. 5, 2022

(87) PCT Pub. No.: WO2021/154372
PCT Pub. Date: Aug. 5, 2021

(65) Prior Publication Data
US 2024/0357506 A1 Oct. 24, 2024

(30) Foreign Application Priority Data

Jan. 31, 2020 (GR) .............................. 20200100049

(51) Int. Cl.
*H04W 52/14* (2009.01)
*H04W 52/24* (2009.01)
*H04W 52/28* (2009.01)

(52) U.S. Cl.
CPC ....... *H04W 52/146* (2013.01); *H04W 52/242* (2013.01); *H04W 52/245* (2013.01); *H04W 52/285* (2013.01)

(58) Field of Classification Search
CPC .................................................. H04W 52/246
See application file for complete search history.

(56) References Cited

U.S. PATENT DOCUMENTS

2005/0003846 A1    1/2005   Anderson
2015/0078270 A1*   3/2015   Seo ........................ H04W 52/46
                                                                            370/329

(Continued)

FOREIGN PATENT DOCUMENTS

CN    103621155 A    3/2014
CN    107852199 A    3/2018

OTHER PUBLICATIONS

International Search Report and Written Opinion—PCT/US2020/061638—ISA/EPO—Feb. 25, 2021.

(Continued)

*Primary Examiner* — Hsinchun Liao
(74) *Attorney, Agent, or Firm* — Patterson+ Sheridan, L.L.P.

(57) ABSTRACT

Certain aspects of the present disclosure provide techniques for determining application time for a path loss reference signal (PL RS) by a user equipment (UE). A method that may be performed by a UE includes receiving an indication of activation of a PL RS. The method further includes transmitting an acknowledgement for the indication. The method further includes measuring samples of the PL RS for a number of samples after transmitting the acknowledgement prior to utilizing the measured samples of the PL RS for uplink power control. The method further includes utilizing the measured samples of the PL RS for uplink (Continued)

power control after measuring at least the number of samples of the PL RS. The number of samples varies based on one or more factors.

30 Claims, 8 Drawing Sheets

(56) References Cited

U.S. PATENT DOCUMENTS

| | | | |
|---|---|---|---|
| 2018/0049137 A1* | 2/2018 | Li | H04W 52/242 |
| 2019/0289552 A1 | 9/2019 | Jain et al. | |
| 2019/0349866 A1 | 11/2019 | Lin et al. | |
| 2020/0221405 A1* | 7/2020 | Zarifi | H04W 52/50 |

OTHER PUBLICATIONS

OPPO: "Discussion on Rel-16 eMIMO UE Features", 3GPP Draft, 3GPP TSG RAN WG1 #100bis, R1-2001738, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020 Apr. 10, 2020 (Apr. 10, 2020), XP051873312, 7 Pages, Retrieved from the Internet: URL:https://ftp.3gpp.org/tsg_ran/WG1_RL1/TSGR1_100b_e/Docs/R1-2001738.zip [retrieved on Apr. 10, 2020] abstract Section 2.3: "Multi-Beam Operation".

ZTE: "Discussion on MAC-CE based PL RS update", 3GPP TSG-RAN WG4 Meeting #93, R4-1914791, Reno, US, Nov. 18-Nov. 22, 2019, 3 Pages.

* cited by examiner

PATH LOSS REFERENCE SIGNAL (PL RS) APPLICATION TIME

CROSS-REFERENCE TO RELATED APPLICATIONS

This application is a national stage application under 35 U.S.C. 371 of PCT/US2020/061638, filed Nov. 20, 2020, which claims benefit of and priority to Greek patent application Ser. No. 20200100049, filed Jan. 31, 2020, which are hereby expressly incorporated by reference herein in their entireties as if fully set forth below and for all applicable purposes.

BACKGROUND

Field of the Disclosure

Aspects of the present disclosure relate to wireless communications, and more particularly, to techniques for utilizing a path loss reference signal (PL RS) by a user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations and user equipments in a wireless network.

Certain aspects of the subject matter described in this disclosure can be implemented in a method for wireless communication by a user equipment (UE). The method generally includes receiving an indication of activation of a pathloss reference signal (PL RS). The method further includes transmitting an acknowledgement for the indication. The method further includes measuring samples of the PL RS for a number of samples after transmitting the acknowledgement prior to utilizing the measured samples of the PL RS for uplink power control. The method further includes utilizing the measured samples of the PL RS for uplink power control after measuring at least the number of samples of the PL RS. The number of samples is based on one or more factors. The one or more factors include whether, in a time window prior to receiving the indication, the UE measured previous samples of the PL RS at least for a threshold duration or a threshold number of samples. The one or more factors include whether, in the time window prior to receiving the indication, the UE received a previous indication to activate the PL RS. The one or more factors include a variance in signal strength between the measured samples. The one or more factors include a mobility status of the UE.

Certain aspects of the subject matter described in this disclosure can be implemented in a method for wireless communication by a base station (BS). The method generally includes transmitting an indication of activation of a pathloss reference signal (PL RS) to a user equipment (UE). The method further includes receiving an acknowledgement for the indication. The method further includes transmitting the PL RS to the UE. The method further includes transmitting a configuration of one or more factors to the UE, wherein a number of samples of the PL RS the UE measures after transmitting the acknowledgement prior to utilizing the measured samples of the PL RS for uplink power control is based on the one or more factors. The one or more factors include whether, in a time window prior to receiving the indication, the UE measured previous samples of the PL RS at least for a threshold duration or a threshold number of samples. The one or more factors include whether, in the time window prior to receiving the indication, the UE received a previous indication to activate the PL RS. The one or more factors include a variance in signal strength between the measured samples. The one or more factors include a mobility status of the UE.

Certain aspects of the subject matter described in this disclosure can be implemented in a method for wireless communication by a user equipment (UE). The method generally includes receiving an indication of activation of a pathloss reference signal (PL RS). The method further includes transmitting an acknowledgement for the indication. The method further includes measuring samples of the PL RS for a number of samples after transmitting the acknowledgement prior to utilizing the measured samples of the PL RS for uplink power control. The method further includes utilizing the measured samples of the PL RS for uplink power control after measuring at least the number of samples of the PL RS. The number of samples varies based on one or more factors.

Certain aspects of the subject matter described in this disclosure can be implemented in a method for wireless communication by a base station (BS). The method generally includes transmitting an indication of activation of a pathloss reference signal (PL RS) to a user equipment (UE). The method further includes receiving an acknowledgement for the indication. The method further includes transmitting the PL RS to the UE. The method further includes transmitting a configuration of one or more factors to the UE, wherein a number of samples of the PL RS the UE measures after transmitting the acknowledgement prior to utilizing the measured samples of the PL RS for uplink power control varies based on the one or more factors.

Certain aspects of the subject matter described in this disclosure can be implemented in a user equipment (UE). The UE generally includes a memory and a processor. The memory and the processor are configured to receive an indication of activation of a pathloss reference signal (PL RS). The memory and the processor are further configured to transmit an acknowledgement for the indication. The memory and the processor are further configured to measure samples of the PL RS for a number of samples after transmitting the acknowledgement prior to utilizing the measured samples of the PL RS for uplink power control. The memory and the processor are further configured to utilize the measured samples of the PL RS for uplink power control after measuring at least the number of samples of the PL RS. The number of samples varies based on one or more factors.

Certain aspects of the subject matter described in this disclosure can be implemented in a base station (BS). The BS generally includes a memory and a processor. The memory and the processor are configured to transmit an indication of activation of a pathloss reference signal (PL RS) to a user equipment (UE). The memory and the processor are further configured to receive an acknowledgement for the indication. The memory and the processor are further configured to transmit the PL RS to the UE. The memory and the processor are further configured to transmit a configuration of one or more factors to the UE, wherein a number of samples of the PL RS the UE measures after transmitting the acknowledgement prior to utilizing the measured samples of the PL RS for uplink power control varies based on the one or more factors.

Certain aspects of the subject matter described in this disclosure can be implemented in a user equipment (UE). The UE generally includes means for receiving an indication of activation of a pathloss reference signal (PL RS). The UE further includes means for transmitting an acknowledgement for the indication. The UE further includes means for measuring samples of the PL RS for a number of samples after transmitting the acknowledgement prior to utilizing the measured samples of the PL RS for uplink power control. The UE further includes means for utilizing the measured samples of the PL RS for uplink power control after measuring at least the number of samples of the PL RS. The number of samples varies based on one or more factors.

Certain aspects of the subject matter described in this disclosure can be implemented in a base station (BS). The BS generally includes means for transmitting an indication of activation of a pathloss reference signal (PL RS) to a user equipment (UE). The BS further includes means for receiving an acknowledgement for the indication. The BS further includes means for transmitting the PL RS to the UE. The BS further includes means for transmitting a configuration of one or more factors to the UE, wherein a number of samples of the PL RS the UE measures after transmitting the acknowledgement prior to utilizing the measured samples of the PL RS for uplink power control varies based on the one or more factors.

Certain aspects of the subject matter described in this disclosure can be implemented in a non-transitory computer-readable medium including instructions that when executed by a user equipment (UE), cause the UE to perform a method for wireless communication. The method generally includes receiving an indication of activation of a pathloss reference signal (PL RS). The method further includes transmitting an acknowledgement for the indication. The method further includes measuring samples of the PL RS for a number of samples after transmitting the acknowledgement prior to utilizing the measured samples of the PL RS for uplink power control. The method further includes utilizing the measured samples of the PL RS for uplink power control after measuring at least the number of samples of the PL RS. The number of samples varies based on one or more factors.

Certain aspects of the subject matter described in this disclosure can be implemented in a non-transitory computer-readable medium including instructions that when executed by a base station (BS), cause the BS to perform a method for wireless communication. The method generally includes transmitting an indication of activation of a pathloss reference signal (PL RS) to a user equipment (UE). The method further includes receiving an acknowledgement for the indication. The method further includes transmitting the PL RS to the UE. The method further includes transmitting a configuration of one or more factors to the UE, wherein a number of samples of the PL RS the UE measures after transmitting the acknowledgement prior to utilizing the measured samples of the PL RS for uplink power control varies based on the one or more factors.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
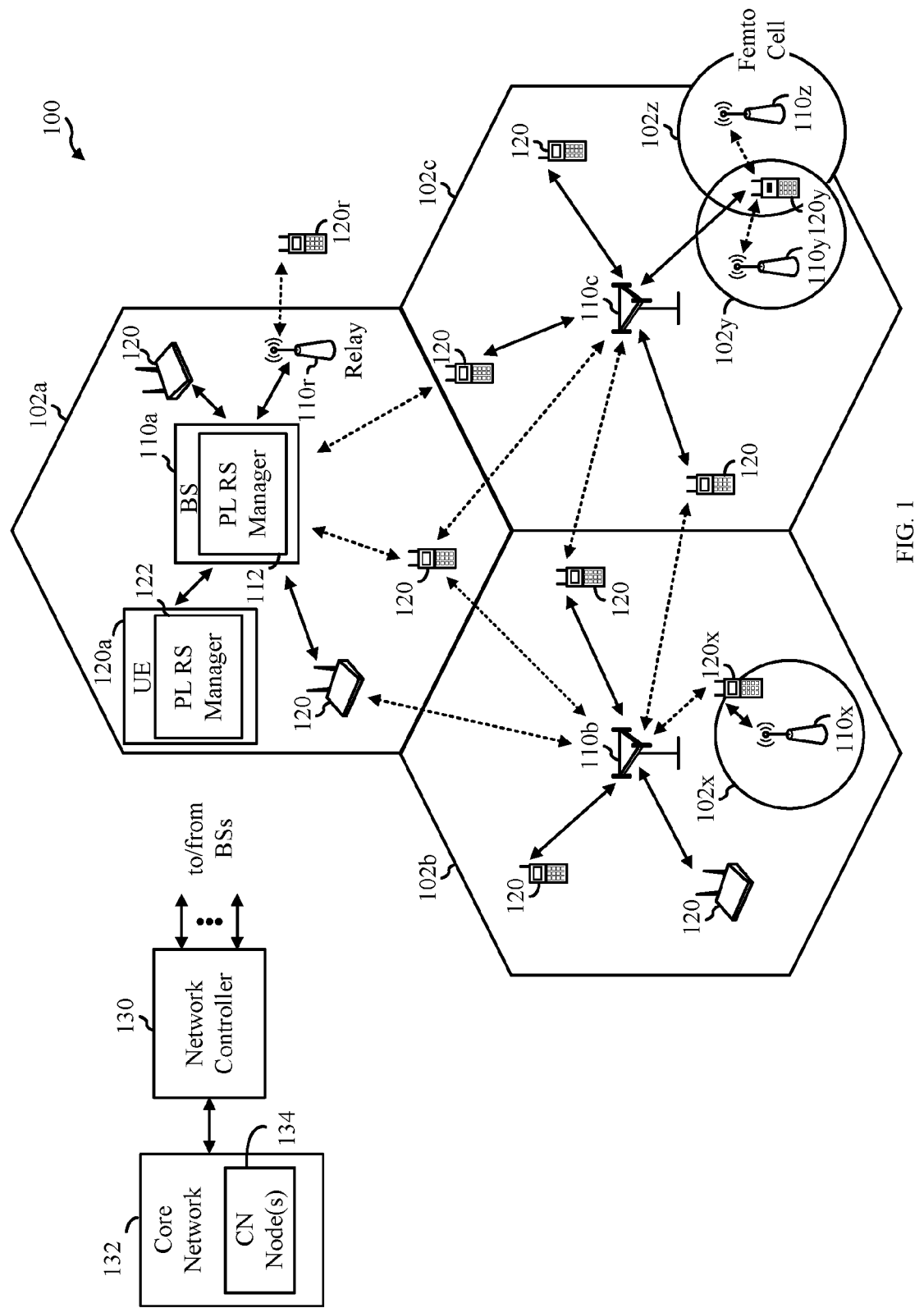
FIG. 1 is a block diagram conceptually illustrating an example telecommunications system, in accordance with certain aspects of the present disclosure.

Aspects of the present disclosure provide apparatus, methods, processing systems, and computer readable mediums for determining application time for a path loss reference signal (PL RS) by a UE, such as for uplink power control.

A UE may receive a PL RS from a BS. The UE may measure the PL RS to determine downlink channel quality between the UE and the BS. For example, based on the measurement of the PL RS, the UE may estimate path loss between the UE and the BS on the downlink. In certain aspects, the estimated path loss on the downlink may also be applicable to estimated path loss on a corresponding uplink (e.g., if the downlink and uplink have similar channel conditions). For example, the UE determines estimated path loss on an uplink based on the measured PL RS.

In certain aspects, the PL RS is associated with one or more types of uplink transmission. For example, the BS may transmit a plurality of different PL RS, where each PL RS is associated with a particular one or more types of uplink transmission such as one or more of a physical uplink shared channel (PUSCH), a sounding reference signal (SRS), an aperiodic SRS (AP-SRS), a semi-persistent SRS (SP-SRS), a periodic SRS (P-SRS), or a physical uplink control channel (PUCCH). In certain aspects, based on measuring the PL RS and determining estimated path loss between the UE and the BS, the UE is configured to perform uplink power control. For example, in certain aspects the UE is configured to perform uplink power control to adjust a transmission power used by the UE to transmit an uplink transmission of a type associated with the PL RS.

In certain aspects, the PL RS may be associated with a particular beam. For example, the UE and/or the BS may utilize beamforming for transmitting and/or receiving signals. In particular, the UE and/or the BS may utilize receive-side beamforming to perform beamforming when receiving signals, such that signals are received with increased gain (e.g., amplified) in a particular direction and decreased gain (e.g., attenuated) in other directions. Further, the UE and/or the BS may utilize transmit-side beamforming to perform beamforming when transmitting signals, such that signals are transmitted with increased gain (e.g., amplified) in a particular direction and decreased gain (e.g., attenuated) in other directions. A pair of a transmit beam, used by a device to send signals, and a receive beam, used by another device to receive signals, may be referred to as a beam pair or beam pair link. Accordingly, in certain aspects, the estimated path loss by the UE may be for a particular beam pair, a particular transmit beam of the BS, and or a particular receive beam of the UE.

In certain aspects, the UE utilizes or applies the PL RS for taking one or more actions. For example, based on the estimated path loss from measuring the PL RS, the UE may one or more of perform uplink power control, perform a handover from one BS to another, declare a radio link failure (RLF), perform downlink and/or uplink beam management, etc. For example, if the PL RS indicates that path loss between the UE and a BS is high (e.g., above a threshold), the UE may perform uplink power control. In another example, if the PL RS indicates that path loss between the UE and a BS is high, the UE may perform handover from the BS to another BS. In another example, if the PL RS indicates that path loss between the UE and a BS is high for a particular beam pair, the UE and/or BS may perform beam management procedure (e.g., beam selection procedures) to select a new beam pair for communication. In another example, if the PL RS indicates that path loss between the UE and a BS is high, the UE may increase transmit power for transmitting on an uplink or perform other uplink power control.

In certain aspects, a BS is configured to activate a particular PL RS, such as of a plurality of PL RSs transmitted by the BS, for a UE. In particular, in certain such aspects, the UE is configured to track, monitor, and/or measure the particular PL RS when activated. The particular PL RS may be associated with one or more of a particular transmit beam of the BS, a particular receive beam of the UE, or a particular uplink channel/transmission by the UE to the BS. Accordingly, measurement of the particular PL RS when activated may be used to perform an action, as discussed, with respect to a particular transmit beam of the BS, a particular receive beam of the UE, or a particular uplink channel/transmission by the UE to the BS.

In certain aspects, the UE after receiving activation of a particular PL RS, is configured to wait/delay until it has measured a threshold number of samples of the PL RS or measured the PL RS for a threshold duration prior to using the measurements of the PL RS to perform an action, such as uplink power control. This delay time may be referred to as the PL RS application time. For example, the threshold number of samples may be five in certain aspects. In certain aspects, this allows the UE to estimate path loss averaged over a number of samples, so as to better estimate path loss.

In certain aspects, the periodicity may be long for how often the BS transmits the PL RS. For example, with a periodicity of 20 ms, the UE may not be able to receive 5 samples of PL RS for 100 ms after activation of the PL RS, meaning it cannot apply/perform actions based on the measured PL RS for 100 ms.

Certain aspects herein advantageously reduce the delay in the application/performance of actions based on the measured PL RS at the UE in certain circumstances. Advantageously, this may allow the UE to more quickly perform actions that improve communications between the UE and the BS, which may increase throughput, reliability, data rate, etc. For example, certain aspects herein provide techniques for the UE to determine/utilize the PL RS application time as based on one or more factors. Accordingly, in certain such aspects, the PL RS application is not fixed, but rather can be dynamically determined, thereby potentially reducing delay in certain situations based on the one or more factors.

The following description provides examples of determination/use of PL RS application time based on one or more factors in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for determining/utilizing a PL RS application time as based on one or more factors. As shown in FIG. 1, the BS 110a includes a PL RS manager 112. The PL RS manager 112 may be configured to perform methods as discussed herein for determining/utilizing a PL RS application time, in accordance with aspects of the present disclosure. As shown in FIG. 1, the UE 120a includes a PL RS manager 122. The PL RS manager 122 may be configured to perform methods as discussed herein for determining/utilizing a PL RS application time, in accordance with aspects of the present disclosure.

Figure 2:
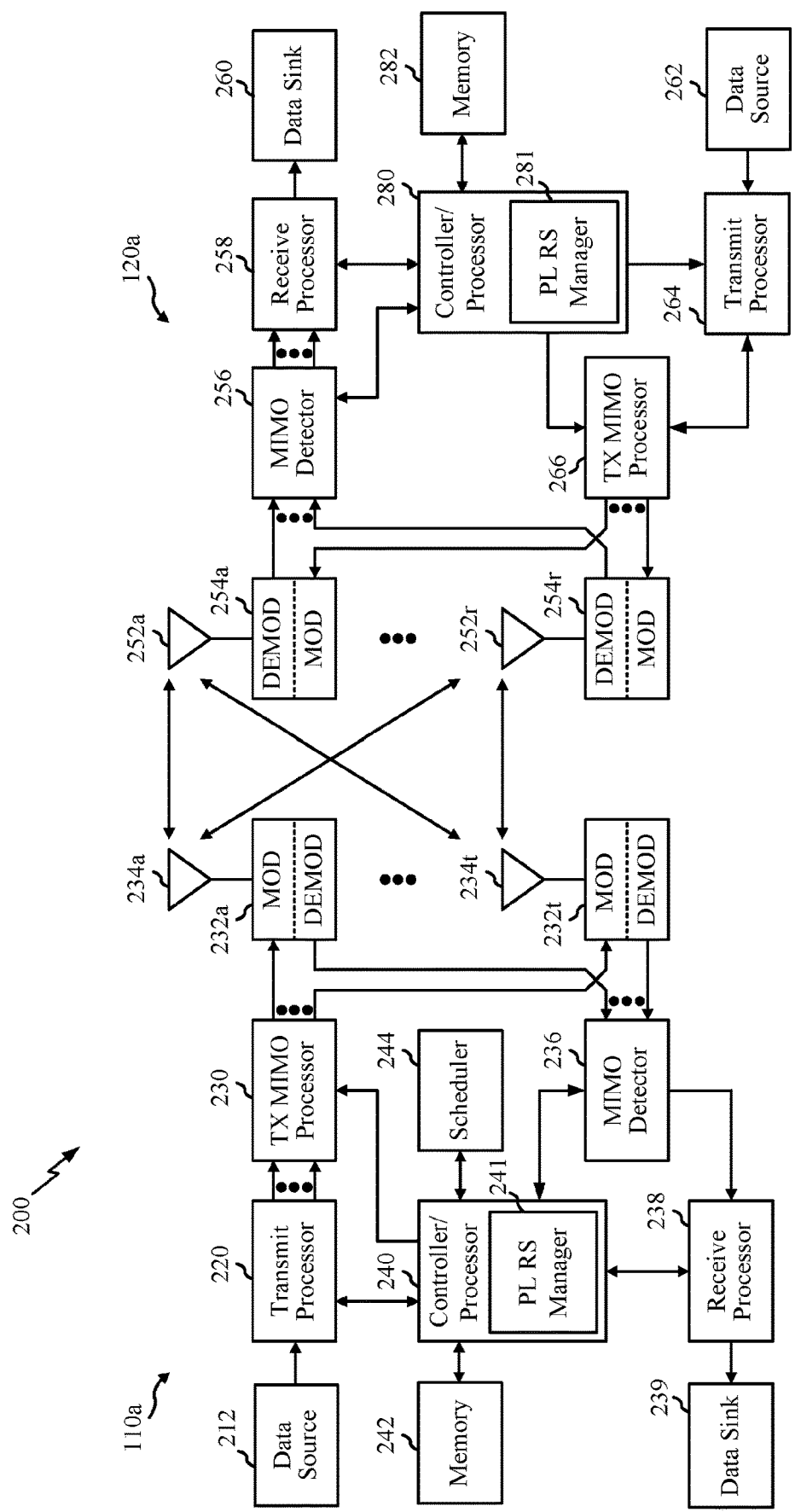
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PL RS manager 241 that may be configured for determining/utilizing a PL RS application time, according to aspects described herein. As shown in FIG. 2, the controller/processor 280 of the UE 120a has a PL RS manager 281 that may be configured for determining/utilizing a PL RS application time, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
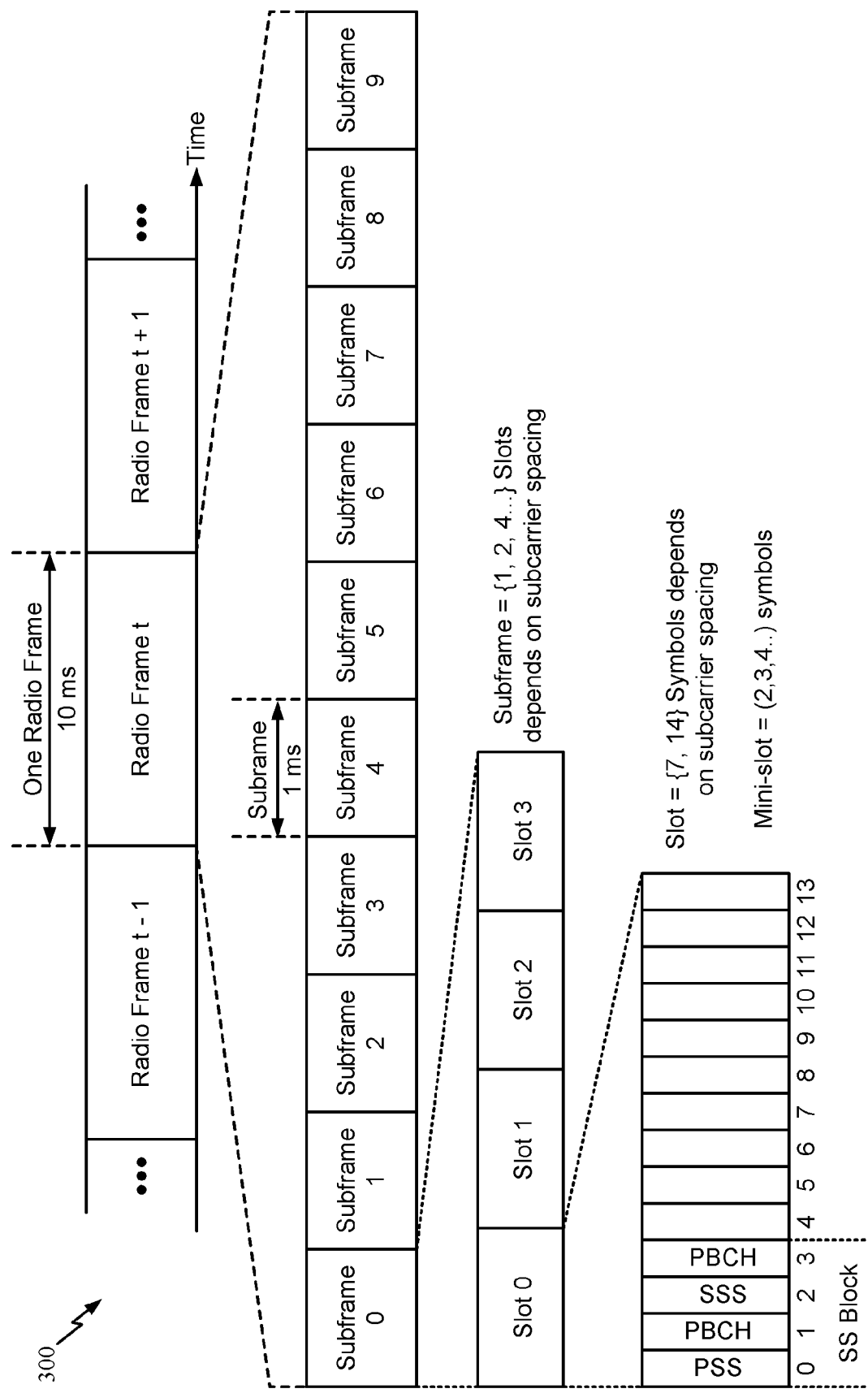
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Beamforming

Figure 4:
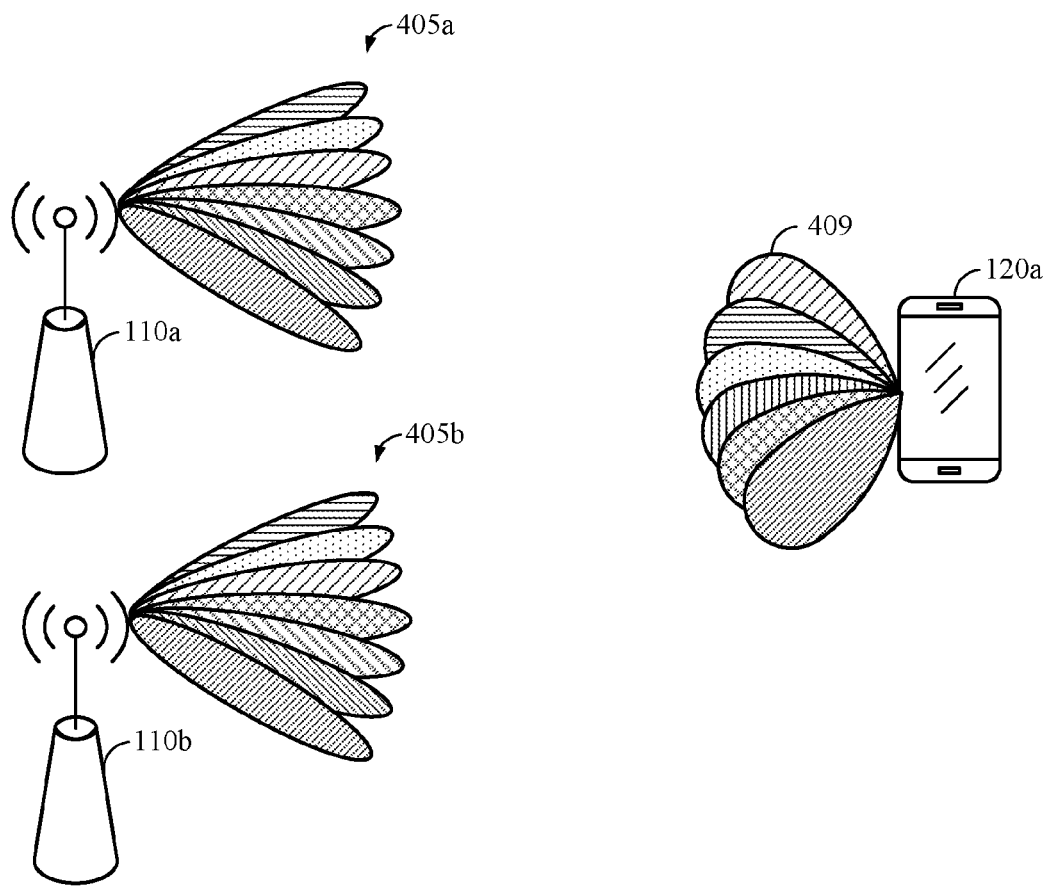
FIG. 4 illustrates example beamformed transmission by BSs and beamformed reception by a UE, in accordance with certain aspects of the present disclosure.

FIG. 4 illustrates example beamformed transmission by BSs (e.g., a first BS 110a and a second BS 110b of FIG. 1) and beamformed reception by a UE (e.g., UE 120a of FIG. 1). As shown, each of the first BS 110a and the second BS 110b transmits over a plurality of transmit beams 405a and 405b, respectively. Further, UE 120a receives over a plurality of receive beams 409.

Example PL RS Application Time

In certain aspects, enhancement for multi-beam operations (e.g., where the UE and/or BS use multiple beams for communication) is desirable, such as targeting different frequency bands, such as FR2 (e.g., 24.25 GHz to 52.6 GHz frequency bands) and/or FR1 (e.g., sub 6 GHz frequency bands). In certain aspects it is desirable to identify and specify features to facilitate more efficient (e.g., lower latency and overhead) DL/UL beam management to support higher intra-and L1/L2-centric inter-cell mobility and/or a larger number of configured transmission configuration indicator (TCI) states. One example feature is use of a common beam for data and control transmission/reception for DL and UL, especially for intra-band carrier aggregation (CA). Another example feature is use of a unified TCI framework for DL and UL beam indication. Another example feature is enhancement on signaling mechanisms for the above features to improve latency and efficiency with more usage of dynamic control signaling, such as opposed to radio resource control (RRC) signaling.

In certain aspects it is desirable to identify and specify features to facilitate UL beam selection for UEs equipped with multiple panels, considering UL coverage loss mitigation due to maximum permissible exposure (MPE), based on UL beam indication with the unified TCI framework for UL fast panel selection.

In certain aspects, enhancement on the support for multi-TRP deployment, such as targeting both FR1 and FR2, is desirable. In certain aspects it is desirable to identify and specify features to improve reliability and robustness for channels other than PDSCH (e.g., PDCCH, PUSCH, and PUCCH) using multi-TRP and/or multi-panel. In certain aspects it is desirable to identify and specify quasi-co-location (QCL)/TCI-related enhancements to enable inter-cell multi-TRP operations, assuming multi-downlink control information (DCI) based multi-PDSCH reception. In certain aspects it is desirable to evaluate and, if needed, specify beam-management-related enhancements for simultaneous multi-TRP transmission with multi-panel reception.

Accordingly, for example in view of such desires, aspects of the present disclosure provide techniques for the UE to determine/utilize the PL RS application time as based on one or more factors.

In certain aspects, as discussed, BS 110a is configured to activate one or more PL RSs for a UE 120a. For example, the BS 110a sends an indication to UE 120a, such as using a medium access control (MAC)-control element (CE) (MAC-CE), or downlink control information (DCI), to activate one or more PL RSs.

In certain aspects, such as prior to such activation of a PL RS, the BS 110a configures the UE 120a with one or more (e.g., multiple) PL RSs, such as using RRC signaling. The BS 110a can then activate/update one or more (e.g., one) of the one or more configured PL RSs at the UE 120a using a MAC-CE. As discussed, in one example, the activated PL RS may be for a SRS resource set, such as for AP-SRS and/or SP-SRS.

In certain aspects, after the UE 120a receives an indication, e.g., MAC-CE, to activate a particular PL RS from the BS 110a, the UE 120a sends an acknowledgement (ACK) to the BS 110a acknowledging the activation of the particular PL RS. The UE 120a may then start measuring the PL RS, such as measuring samples of the PL RS. In certain aspects, the BS transmits the PL RS periodically, and measurement of a PL RS in a period is considered measurement of a sample. As discussed, in certain aspects, the UE 120a is configured to wait for a PL RS application time prior to utilizing the measured PL RS for an action, such as uplink power control as discussed. In certain aspects, the PL RS application time is measured from the end of the transmission of the ACK by the UE 120a.

In certain aspects, the UE 120a determines the PL RS application time based on one or more factors, such as further discussed herein. In certain aspects, the one or more factors considered may be different for different types of PL RS (e.g., based on a reference signal channel of the PL RS, wherein the reference signal channel is one of synchronization signal block (SSB), channel state information reference signal (CSI-RS), or positioning reference signal (PRS), based on a reference signal source of the PL RS, wherein the reference signal source is one of a serving cell or a non-serving cell of the UE). For example, in certain aspects, nonserving cells are needed for PRS, and measurement may not always be successful, so a 'default' (e.g., SSB of master information block (MIB)) is defined for the case of unsuccessful pathloss estimation.

In certain aspects, a factor includes whether, in a time window prior to receiving the indication, the UE 120a measured previous samples of the PL RS from the BS 110a at least for a threshold duration or a threshold number of samples. In certain aspects, the PL RS application time is less when the UE 120a has measured previous samples of the PL RS for the threshold duration or the threshold number of samples as compared to when the UE 120a has not measured previous samples of the PL RS for the threshold duration or the threshold number of samples. For example, if the UE 120a has not measured previous samples of the PL RS for the threshold duration or the threshold number of samples, a default PL RS application time may be used (e.g., 5 samples). In certain aspects, if the UE 120a has measured previous samples of the PL RS for the threshold duration or the threshold number of samples, less than the default PL RS application time may be used (e.g., 1, 2, 3, or 4 samples). In certain aspects, the less than the default PL RS application time may be based on the number of or duration of previous samples of the PL RS measured by the UE 120a within the time window.

In certain aspects, the UE 120a is configured to initialize L3 filtering with the previous measurements of PL RS.

In certain aspects, UE 120a reuses higher layer filtered signal strength (e.g. RSRP) for pathloss measurement, such as with the defining applicable timing after the MAC-CE. In certain aspects, filtered signal strength value for a previously PL RS is used before the application time, which is the next slot after the number of samples is measured, where the first measurement sample corresponds to be the first instance, such as 3 ms after sending ACK for the MAC CE. In certain aspects, this is only applicable to UEs supporting the number of RRC-configurable PL RSs greater than 4, and only for the case that the activated PL RS by the MAC CE is not tracked by the UE. In certain aspects, a UE is only required to track the activated PL RS if the configured PL RSs by RRC is greater than 4. In certain aspects, it is up to the UE whether to update the filtered signal strength value for previous PL RS, such as 3 ms after sending ACK for the MAC CE.

The time window, threshold duration, and/or threshold number of samples may be pre-configured at the UE 120a, such as based on a standard. The time window, threshold duration, and/or threshold number of samples may be indicated to the UE 120a by the BS 110a, such as via RRC signaling or other signaling. For example, the BS 110a may determine the threshold duration and/or threshold number of samples, such as based on reports from UE 120a (e.g., regarding channel conditions).

The use of the time window may ensure that the previously measured samples are not too old/stale such that they still represent current channel conditions, such as path loss. The use of the threshold duration or a threshold number of samples may ensure that there are sufficient previous samples to allow for a shorter PL RS application time, while still properly estimating path loss.

In certain aspects, a factor includes whether, in a time window prior to receiving the indication, the UE received a previous indication (e.g., command such as via MAC-CE) to activate the PL RS. In certain aspects, the PL RS application time is less when the UE received the previous indication to activate the PL RS as compared to when the UE has not received the previous indication to activate the PL RS. For example, if the UE 120a has not received the previous indication to activate the PL RS, a default PL RS application time may be used (e.g., 5 samples). In certain aspects, if the UE 120a has received the previous indication to activate the PL RS, less than the default PL RS application time may be used (e.g., 1, 2, 3, or 4 samples).

The time window may be pre-configured at the UE 120a, such as based on a standard. The time window may be indicated to the UE 120a by the BS 110a, such as via RRC signaling or other signaling.

The use of the time window may ensure that the previously measured samples based on the previous activation indication are not too old/stale such that they still represent current channel conditions, such as path loss.

In certain aspects, a factor includes a variance in signal strength between the measured samples. For example, after receiving an indication to activate a PL RS, the UE 120a may begin measuring PL RS samples. Prior to reaching a default number of measured samples (e.g., 5), the UE 120a may determine a variance in measured signal strength (e.g., reference signal received power (RSRP), a reference signal received quality (RSRQ), or signal-to-noise-plus-interference ratio (SINR)) of the samples measured thus far as each new sample is measured. The variance may be a maximum difference in signal strength between the measured samples thus far. In certain aspects, the PL RS application time is a first value, such as the default number of measured samples, when the variance in signal strength between the measured samples over a second number of samples less than the first value is greater than a threshold variance, and the PL RS application time is the second number of samples when the variance in signal strength between the measured samples over the second number of samples is less than the threshold variance.

In certain aspects, the threshold variance is indicated to the UE 120a by the BS 110a, such as using RRC signaling. In certain aspects, the threshold variance is pre-configured at the UE 120a, such as based on a standard.

In certain aspects, a factor includes a mobility status of the UE. In certain aspects, the PL RS application time is less when the mobility status of the UE indicates lower mobility as compared to when the mobility status of the UE indicates higher mobility. In certain aspects, the UE 120a determines the mobility status of the UE. In certain aspects, the BS 110a determines the mobility status of the UE. In certain aspects, the mobility status of the UE is based on one or more of UE speed, or a frequency of cell change of the UE.

As discussed, after the PL RS application time, the UE 120a may utilize the measured PL RS to perform uplink power control.

Figure 5:
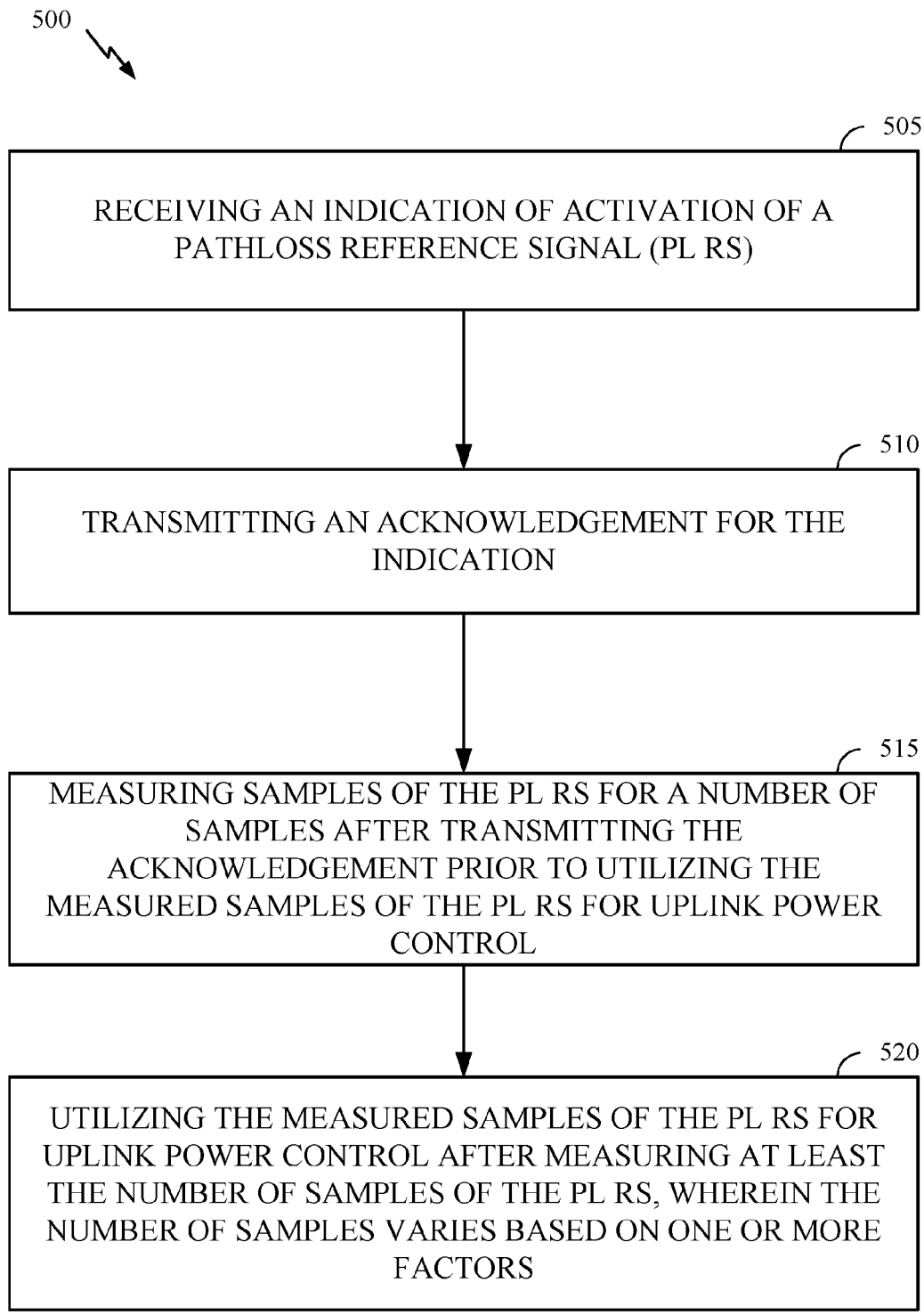
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100). The operations 500 may be complimentary operations by the UE to the operations 600 performed by the BS. Operations 500 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 505, by receiving an indication of activation of a pathloss reference signal (PL RS). Operations 500 continue at 510 by transmitting an acknowledgement for the indication. Operations 500 continue at 515 by measuring samples of the PL RS for a number of samples after transmitting the acknowledgement prior to utilizing the measured samples of the PL RS for uplink power control. Operations 500 continue at 520 by utilizing the measured samples of the PL RS for uplink power control after measuring at least the number of samples of the PL RS, wherein the number of samples varies based on one or more factors.

In certain aspects of operations 500, the one or more factors include whether, in a time window prior to receiving the indication, the UE measured previous samples of the PL RS at least for a threshold duration or a threshold number of samples. In certain aspects of operations 500, the one or more factors include whether, in the time window prior to receiving the indication, the UE received a previous indication to activate the PL RS. In certain aspects of operations 500, the one or more factors include a variance in signal strength between the measured samples. In certain aspects of operations 500, the one or more factors include a mobility status of the UE.

In certain aspects of operations 500, the one or more factors on which the number of samples is based depends on a type of the PL RS.

In certain aspects of operations 500, the type of the PL RS is based on a reference signal channel of the PL RS, wherein the reference signal channel is one of synchronization signal block (SSB), channel state information reference signal (CSI-RS), or positioning reference signal (PRS).

In certain aspects of operations 500, the type of the PL RS is based on a reference signal source of the PL RS, wherein the reference signal source is one of a serving cell or a non-serving cell of the UE.

In certain aspects of operations 500, the number of samples is less when the UE has measured previous samples of the PL RS for the threshold duration or the threshold number of samples as compared to when the UE has not measured previous samples of the PL RS for the threshold duration or the threshold number of samples.

In certain aspects of operations 500, the threshold duration or the threshold number of samples is indicated to the UE by a base station.

In certain aspects of operations 500, the operations further include initializing L3 filtering with the measured previous samples.

In certain aspects of operations 500, a duration of the time window is indicated to the UE by a base station.

In certain aspects of operations 500, a duration of the time window is preconfigured.

In certain aspects of operations 500, the number of samples is less when the UE received the previous indication to activate the PL RS as compared to when the UE has not received the previous indication to activate the PL RS.

In certain aspects of operations 500, the number of samples is less when the variance in signal strength is smaller as compared to when the variance in signal strength is larger.

In certain aspects of operations 500, the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

In certain aspects of operations 500, the threshold variance is indicated to the UE by a base station.

In certain aspects of operations 500, the threshold variance is preconfigured.

In certain aspects of operations 500, the variance is a maximum difference between signal strengths of the measured samples.

In certain aspects of operations 500, the signal strength is one or more of a reference signal received power (RSRP), a reference signal received quality (RSRQ), or signal-to-noise-plus-interference ratio (SINR).

In certain aspects of operations 500, the number of samples is less when the mobility status of the UE indicates lower mobility as compared to when the mobility status of the UE indicates higher mobility.

In certain aspects of operations 500, the operations further include determining the mobility status of the UE.

In certain aspects of operations 500, a base station determines a mobility status of the UE and indicates the mobility status of the UE to the UE.

In certain aspects of operations 500, the mobility status of the UE is based on one or more of UE speed, or a frequency of cell change of the UE.

Figure 6:
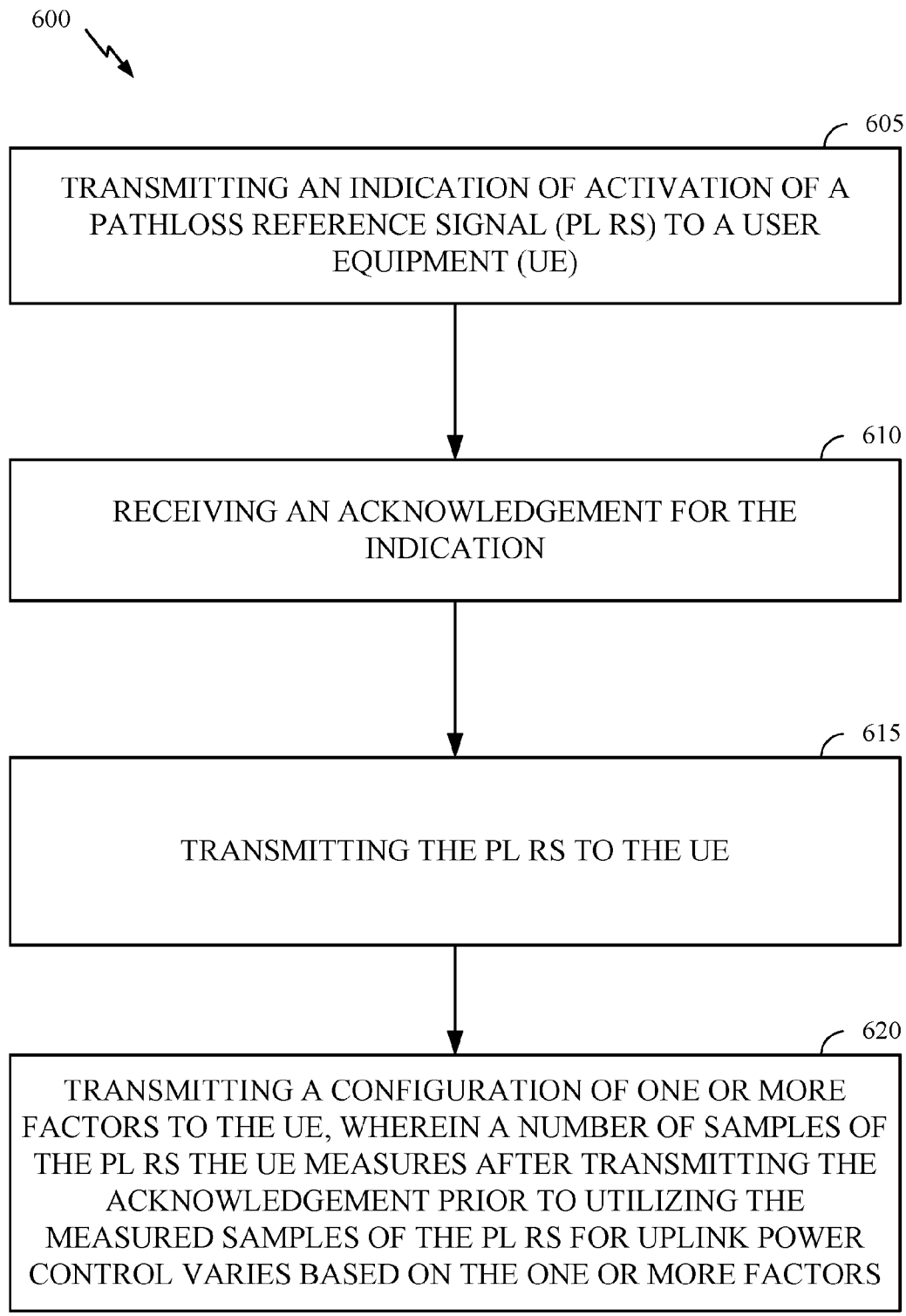
FIG. 6 is a flow diagram illustrating example operations for wireless communication by a BS, in accordance with certain aspects of the present disclosure.
Figure 7:
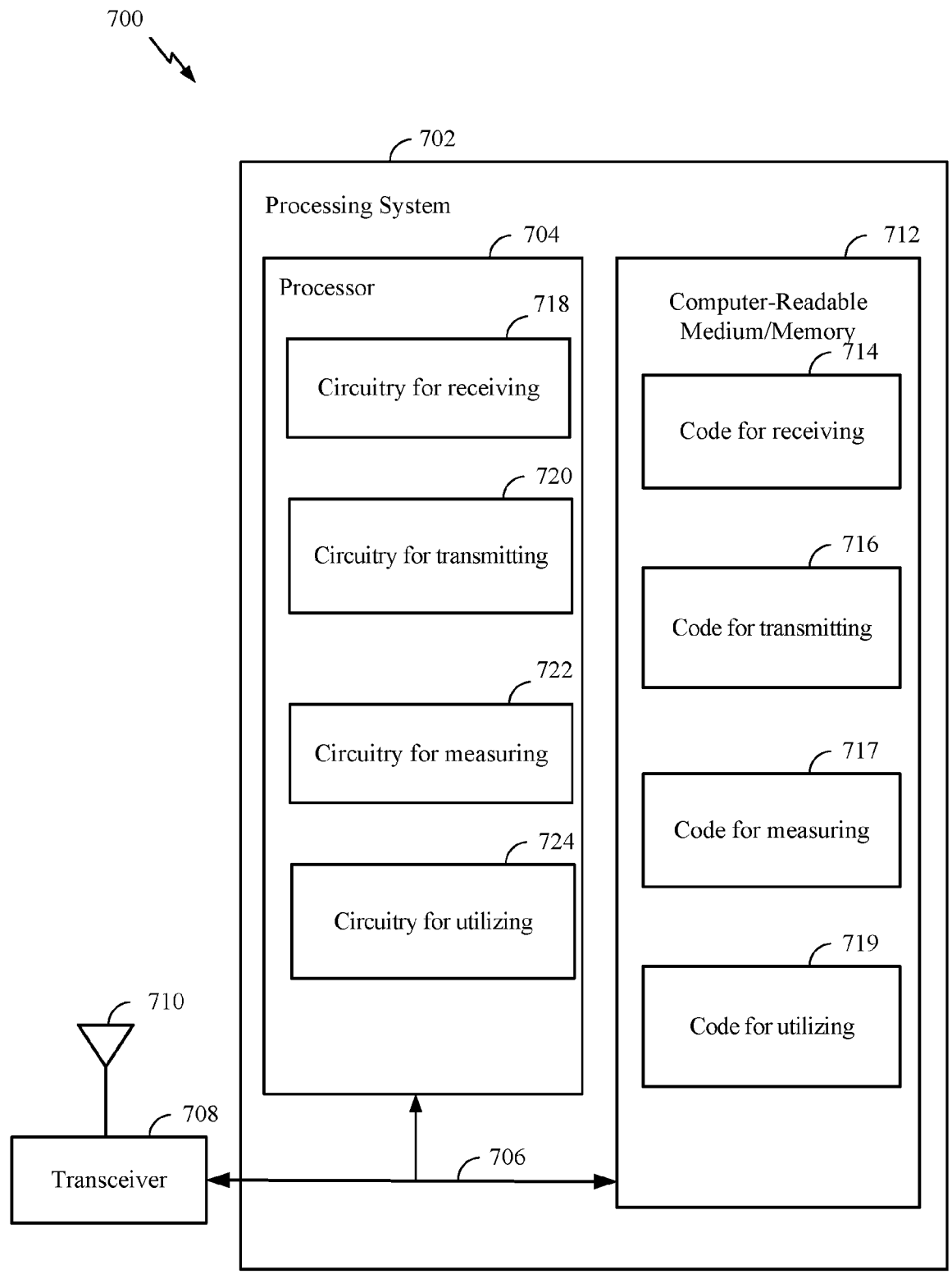
FIG. 7 illustrates a communications device that may include various components configured to perform operations for the techniques disclosed herein in accordance with aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110*a* in the wireless communication network 100). The operations 600 may be complimentary operations by the BS to the operations 500 performed by the UE. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 605, by transmitting an indication of activation of a pathloss reference signal (PL RS) to a user equipment (UE). The operations 600 continue at 610 by, receiving an acknowledgement for the indication. The operations 600 continue at 615 by, transmitting the PL RS to the UE. The operations 600 continue at 620 by, transmitting a configuration of one or more factors to the UE, wherein a number of samples of the PL RS the UE measures after transmitting the acknowledgement prior to utilizing the measured samples of the PL RS for uplink power control varies based on the one or more factors.

In certain aspects of operations 600, the one or more factors include whether, in a time window prior to receiving the indication, the UE measured previous samples of the PL RS at least for a threshold duration or a threshold number of samples. In certain aspects of operations 600, the one or more factors include whether, in the time window prior to receiving the indication, the UE received a previous indication to activate the PL RS. In certain aspects of operations 600, the one or more factors include a variance in signal strength between the measured samples. In certain aspects of operations 600, the one or more factors include a mobility status of the UE.

In certain aspects of operations 600, the one or more factors on which the number of samples is based depends on a type of the PL RS.

In certain aspects of operations 600, the type of the PL RS is based on a reference signal channel of the PL RS, wherein the reference signal channel is one of synchronization signal block (SSB), channel state information reference signal (CSI-RS), or positioning reference signal (PRS).

In certain aspects of operations 600, the type of PL RS is based on a reference signal source of the PL RS, wherein the reference signal source is one of a serving cell or a non-serving cell of the UE.

In certain aspects of operations 600, the number of samples is less when the UE has measured previous samples of the PL RS for the threshold duration or the threshold number of samples as compared to when the UE has not measured previous samples of the PL RS for the threshold duration or the threshold number of samples.

In certain aspects of operations 600, the configuration comprises the threshold duration or the threshold number of samples.

In certain aspects of operations 600, the operations further include receiving one or more reports from the UE, wherein the threshold duration or the threshold number of samples is based on the one or more reports from the UE.

In certain aspects of operations 600, the configuration comprises a duration of the time window.

In certain aspects of operations 600, the number of samples is less when the UE received the previous indication to activate the PL RS as compared to when the UE has not received the previous indication to activate the PL RS.

In certain aspects of operations 600, the number of samples is less when the variance in signal strength is smaller as compared to when the variance in signal strength is larger.

In certain aspects of operations 600, the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

In certain aspects of operations 600, the configuration comprises the threshold variance.

In certain aspects of operations 600, the variance is a maximum difference between signal strengths of the measured samples.

In certain aspects of operations 600, the signal strength is one or more of a reference signal received power (RSRP), a reference signal received quality (RSRQ), or signal-to-noise-plus-interference ratio (SINR).

In certain aspects of operations 600, the number of samples is less when the mobility status of the UE indicates lower mobility as compared to when the mobility status of the UE indicates higher mobility.

In certain aspects of operations 600, the operations further include determining the mobility status of the UE, wherein the configuration comprises the mobility status of the UE.

In certain aspects of operations 600, the mobility status of the UE is based on one or more of UE speed, or a frequency of cell change of the UE.

FIG. 6 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for determining/utilizing a PL RS application time. In certain aspects, computer-readable medium/memory 712 stores code 714 for receiving; code 716 for transmitting; code 717 for measuring; code 719 for utilizing; etc. In certain aspects, the processor 704 has circuitry configured to implement the code stored in the computer-readable medium/memory 712. The processor 704 includes circuitry 718 for receiving; circuitry 720 for transmitting; circuitry 722 for measuring; circuitry 724 for utilizing; etc.

Figure 8:
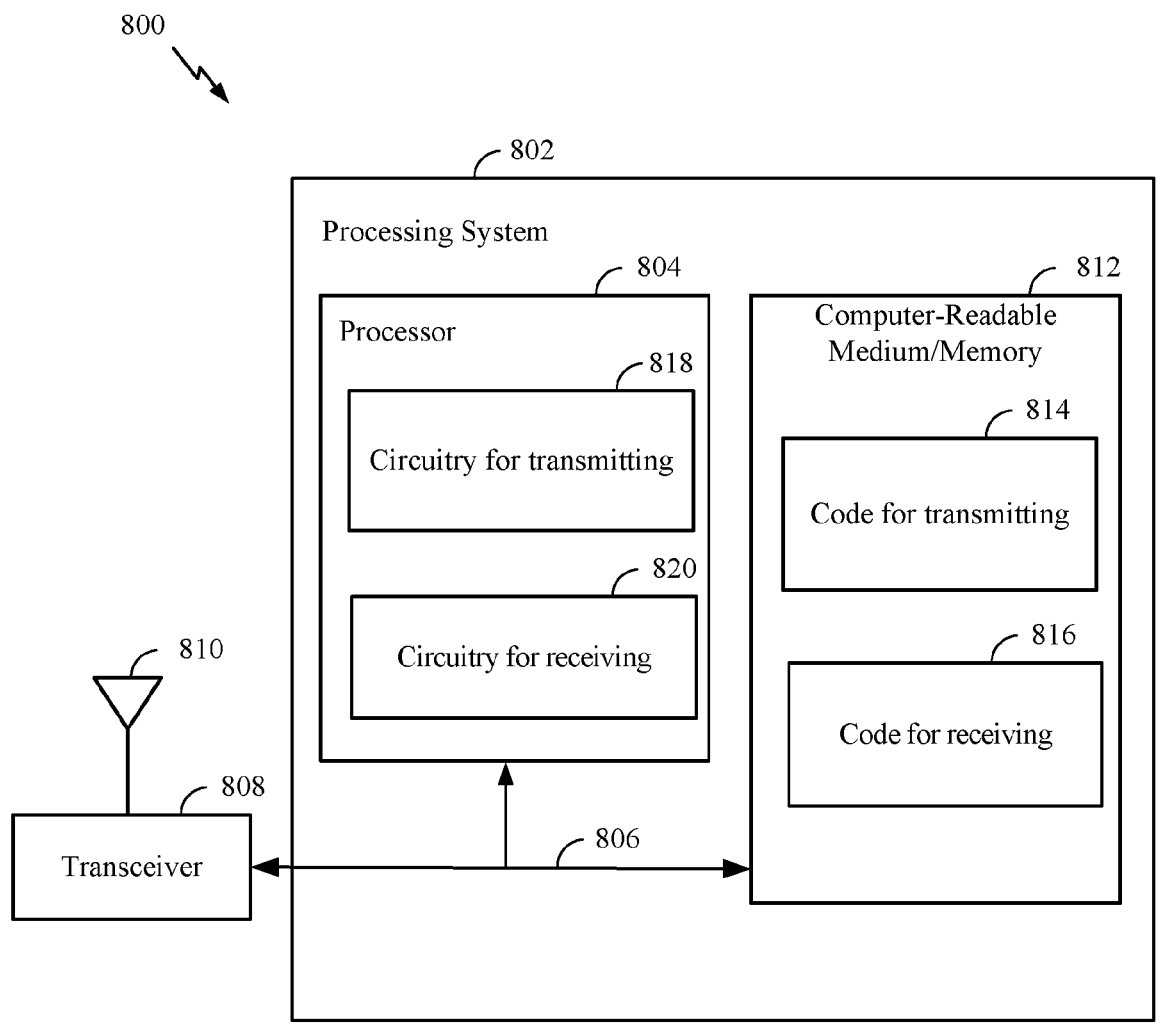
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for determining/utilizing a PL RS application time. In certain aspects, computer-readable medium/memory 812 stores code 814 for transmitting; code 816 for receiving, etc. In certain aspects, the processor 804 has circuitry configured to implement the code stored in the computer-readable medium/memory 812. The processor 804 includes circuitry 818 for transmitting; circuitry 820 for receiving, etc.

Example Embodiments

Embodiment 1: A method for wireless communication by a user equipment (UE), the method comprising: receiving an indication of activation of a pathloss reference signal (PL RS); transmitting an acknowledgment for the indication; measuring samples of the PL RS for a number of samples after transmitting the acknowledgement prior to utilizing the measured samples of the PL RS for uplink power control; and utilizing the measured samples of the PL RS for uplink power control after measuring at least the number of samples of the PL RS, wherein the number of samples varies based on one or more factors.

Embodiment 2: The method of Embodiment 1, wherein the one or more factors comprise one or more of: whether, in a time window prior to receiving the indication, the UE measured previous samples of the PL RS at least for a threshold duration or a threshold number of samples; whether, in the time window prior to receiving the indication, the UE received a previous indication to activate the PL RS; a variance in signal strength between the measured samples; or a mobility status of the UE.

Embodiment 3: The method of any of Embodiments 1-2, wherein the one or more factors on which the number of samples is based depends on a type of the PL RS, wherein the type of the PL RS is based on a reference signal channel of the PL RS, wherein the reference signal channel is one of synchronization signal block (SSB), channel state information reference signal (CSI-RS), or positioning reference signal (PRS).

Embodiment 4: The method of any of Embodiments 1-2, wherein the one or more factors on which the number of samples is based depends on a type of the PL RS, wherein the type of PL RS is based on a reference signal source of the PL RS, wherein the reference signal source is one of a serving cell or a non-serving cell of the UE.

Embodiment 5: The method of any of Embodiments 1-4, wherein the one or more factors comprise whether, in a time window prior to receiving the indication, the UE measured previous samples of the PL RS at least for a threshold duration or a threshold number of samples, wherein the number of samples is less when the UE has measured previous samples of the PL RS for the threshold duration or the threshold number of samples as compared to when the UE has not measured previous samples of the PL RS for the threshold duration or the threshold number of samples.

Embodiment 6: The method of any of Embodiments 1-5, wherein the one or more factors comprise whether, in the time window prior to receiving the indication, the UE received a previous indication to activate the PL RS, wherein the number of samples is less when the UE received the previous indication to activate the PL RS as compared to when the UE has not received the previous indication to activate the PL RS.

Embodiment 7: The method of any of Embodiments 1-6, wherein the one or more factors comprise a variance in signal strength between the measured samples, wherein the number of samples is less when the variance in signal strength is smaller as compared to when the variance in signal strength is larger.

Embodiment 8: The method of any of Embodiments 1-6, wherein the one or more factors comprise a variance in signal strength between the measured samples, wherein the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

Embodiment 9: The method of Embodiment 8, wherein the variance is a maximum difference between signal strengths of the measured samples.

Embodiment 10: The method of any of Embodiments 1-9, wherein the one or more factors comprise a mobility status of the UE, wherein the number of samples is less when the mobility status of the UE indicates lower mobility as compared to when the mobility status of the UE indicates higher mobility.

Embodiment 11: The method of Embodiment 10, wherein the mobility status of the UE is based on one or more of UE speed, or a frequency of cell change of the UE.

Embodiment 12: A method for wireless communication by a base station (BS), the method comprising: transmitting an indication of activation of a pathloss reference signal (PL RS) to a user equipment (UE); receiving an acknowledgement for the indication; transmitting the PL RS to the UE; and transmitting a configuration of one or more factors to the UE, wherein a number of samples of the PL RS the UE measures after transmitting the acknowledgement prior to utilizing the measured samples of the PL RS for uplink power control varies based on the one or more factors.

Embodiment 13: The method of Embodiment 12, wherein the one or more factors comprise one or more of: whether, in a time window prior to receiving the indication, the UE measured previous samples of the PL RS at least for a threshold duration or a threshold number of samples; whether, in the time window prior to receiving the indication, the UE received a previous indication to activate the PL RS; a variance in signal strength between the measured samples; or a mobility status of the UE.

Embodiment 14: The method of any of Embodiments 12-13, wherein the one or more factors on which the number of samples is based depends on a type of the PL RS, wherein the type of the PL RS is based on a reference signal channel of the PL RS, wherein the reference signal channel is one of synchronization signal block (SSB), channel state information reference signal (CSI-RS), or positioning reference signal (PRS).

Embodiment 15: The method of any of Embodiments 12-13, wherein the one or more factors on which the number of samples is based depends on a type of the PL RS, wherein the type of PL RS is based on whether the BS is one of a serving cell or a non-serving cell of the UE.

Embodiment 16: The method of any of Embodiments 12-15, wherein the one or more factors comprise whether, in a time window prior to receiving the indication, the UE measured previous samples of the PL RS at least for a threshold duration or a threshold number of samples, wherein the number of samples is less when the UE has measured previous samples of the PL RS for the threshold duration or the threshold number of samples as compared to when the UE has not measured previous samples of the PL RS for the threshold duration or the threshold number of samples.

Embodiment 17: The method of any of Embodiments 12-16, wherein the one or more factors comprise whether, in the time window prior to receiving the indication, the UE received a previous indication to activate the PL RS, wherein the number of samples is less when the UE received the previous indication to activate the PL RS as compared to when the UE has not received the previous indication to activate the PL RS.

Embodiment 18: The method of any of Embodiments 12-17, wherein the one or more factors comprise a variance in signal strength between the measured samples, wherein the number of samples is less when the variance in signal strength is smaller as compared to when the variance in signal strength is larger.

Embodiment 19: The method of any of Embodiments 12-17, wherein the one or more factors comprise a variance in signal strength between the measured samples, wherein the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

Embodiment 20: The method of Embodiment 19, wherein the variance is a maximum difference between signal strengths of the measured samples.

Embodiment 21: The method of any of Embodiments 12-20, wherein the one or more factors comprise a mobility status of the UE, wherein the number of samples is less when the mobility status of the UE indicates lower mobility as compared to when the mobility status of the UE indicates higher mobility.

Embodiment 22: The method of Embodiment 21, further comprising determining the mobility status of the UE, wherein the configuration comprises the mobility status of the UE.

Embodiment 23: The method of Embodiment 21 or 22, wherein the mobility status of the UE is based on one or more of UE speed, or a frequency of cell change of the UE.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:
1. A method for wireless communication by a user equipment (UE), the method comprising:
receiving an indication of activation of a pathloss reference signal (PL RS);
transmitting an acknowledgement for the indication;

measuring samples of the PL RS for a number of samples after transmitting the acknowledgement prior to utilizing the measured samples of the PL RS for uplink power control; and utilizing the measured samples of the PL RS for uplink power control after measuring at least the number of samples of the PL RS, wherein the number of samples varies based on one or more factors.

2. The method of claim 1, wherein the one or more factors comprise one or more of:

whether, in a time window prior to receiving the indication, the UE measured previous samples of the PL RS at least for a threshold duration or a threshold number of samples;

whether, in the time window prior to receiving the indication, the UE received a previous indication to activate the PL RS;

a variance in signal strength between the measured samples; or p1 a mobility status of the UE.

3. The method of claim 1, wherein the one or more factors on which the number of samples is based depends on a type of the PL RS, wherein the type of the PL RS is based on a reference signal channel of the PL RS, wherein the reference signal channel is one of synchronization signal block (SSB), channel state information reference signal (CSI-RS), or positioning reference signal (PRS).

4. The method of claim 1, wherein the one or more factors on which the number of samples is based depends on a type of the PL RS, wherein the type of PL RS is based on a reference signal source of the PL RS, wherein the reference signal source is one of a serving cell or a non-serving cell of the UE.

5. The method of claim 1, wherein the one or more factors comprise whether, in a time window prior to receiving the indication, the UE measured previous samples of the PL RS at least for a threshold duration or a threshold number of samples, wherein the number of samples is less when the UE has measured previous samples of the PL RS for the threshold duration or the threshold number of samples as compared to when the UE has not measured previous samples of the PL RS for the threshold duration or the threshold number of samples.

6. The method of claim 1, wherein the one or more factors comprise whether, in a time window prior to receiving the indication, the UE received a previous indication to activate the PL RS, wherein the number of samples is less when the UE received the previous indication to activate the PL RS as compared to when the UE has not received the previous indication to activate the PL RS.

7. The method of claim 1, wherein the one or more factors comprise a variance in signal strength between the measured samples, wherein the number of samples is less when the variance in signal strength is smaller as compared to when the variance in signal strength is larger.

8. The method of claim 1, wherein the one or more factors comprise a variance in signal strength between the measured samples, wherein the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

9. The method of claim 8, wherein the variance is a maximum difference between signal strengths of the measured samples.

10. The method of claim 1, wherein the one or more factors comprise a mobility status of the UE, wherein the number of samples is less when the mobility status of the UE indicates lower mobility as compared to when the mobility status of the UE indicates higher mobility.

11. The method of claim 10, wherein the mobility status of the UE is based on one or more of UE speed, or a frequency of cell change of the UE.

12. A user equipment (UE) comprising:

one or more memories collectively storing instructions; and one or more processors coupled to the one or more memories, wherein the one or more processors are collectively configured to execute the instructions to cause the UE to:

receive an indication of activation of a pathloss reference signal (PL RS);

transmit an acknowledgement for the indication;

measure samples of the PL RS for a number of samples after transmitting the acknowledgement prior to utilizing the measured samples of the PL RS for uplink power control; and utilize the measured samples of the PL RS for uplink power control after measuring at least the number of samples of the PL RS, wherein the number of samples varies based on one or more factors.

13. The UE of claim 12, wherein the one or more factors comprise one or more of:

whether, in a time window prior to receiving the indication, the UE measured previous samples of the PL RS at least for a threshold duration or a threshold number of samples;

whether, in the time window prior to receiving the indication, the UE received a previous indication to activate the PL RS;

a variance in signal strength between the measured samples; or a mobility status of the UE.

14. The UE of claim 12, wherein the one or more factors on which the number of samples is based depends on a type of the PL RS, wherein the type of the PL RS is based on a reference signal channel of the PL RS, wherein the reference signal channel is one of synchronization signal block (SSB), channel state information reference signal (CSI-RS), or positioning reference signal (PRS).

15. The UE of claim 12, wherein the one or more factors on which the number of samples is based depends on a type of the PL RS, wherein the type of PL RS is based on a reference signal source of the PL RS, wherein the reference signal source is one of a serving cell or a non-serving cell of the UE.

16. The UE of claim 12, wherein the one or more factors comprise whether, in a time window prior to receiving the indication, the UE measured previous samples of the PL RS at least for a threshold duration or a threshold number of samples, wherein the number of samples is less when the UE has measured previous samples of the PL RS for the threshold duration or the threshold number of samples as compared to when the UE has not measured previous samples of the PL RS for the threshold duration or the threshold number of samples.

17. The UE of claim 12, wherein the one or more factors comprise whether, in a time window prior to receiving the indication, the UE received a previous indication to activate the PL RS, wherein the number of samples is less when the UE received the previous indication to activate the PL RS as compared to when the UE has not received the previous indication to activate the PL RS.

18. The UE of claim 12, wherein the one or more factors comprise a variance in signal strength between the measured samples, wherein the number of samples is less when the variance in signal strength is smaller as compared to when the variance in signal strength is larger.

19. The UE of claim 12, wherein the one or more factors comprise a variance in signal strength between the measured samples, wherein the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

20. The UE of claim 19, wherein the variance is a maximum difference between signal strengths of the measured samples.

21. The UE of claim 12, wherein the one or more factors comprise a mobility status of the UE, wherein the number of samples is less when the mobility status of the UE indicates lower mobility as compared to when the mobility status of the UE indicates higher mobility.

22. The UE of claim 21, wherein the mobility status of the UE is based on one or more of UE speed, or a frequency of cell change of the UE.

23. A non-transitory computer-readable medium comprising instructions which, when executed by one or more processors of a user equipment (UE), cause the UE to perform a method for wireless communication, the method comprising:
receiving an indication of activation of a pathloss reference signal (PL RS);
transmitting an acknowledgement for the indication;
measuring samples of the PL RS for a number of samples after transmitting the acknowledgement prior to utilizing the measured samples of the PL RS for uplink power control; and
utilizing the measured samples of the PL RS for uplink power control after measuring at least the number of samples of the PL RS, wherein the number of samples varies based on one or more factors.

24. The non-transitory computer-readable medium of claim 23, wherein the one or more factors comprise one or more of:
whether, in a time window prior to receiving the indication, the UE measured previous samples of the PL RS at least for a threshold duration or a threshold number of samples;
whether, in the time window prior to receiving the indication, the UE received a previous indication to activate the PL RS;
a variance in signal strength between the measured samples; or
a mobility status of the UE.

25. The non-transitory computer-readable medium of claim 23, wherein the one or more factors on which the number of samples is based depends on a type of the PL RS, wherein the type of the PL RS is based on a reference signal channel of the PL RS, wherein the reference signal channel is one of synchronization signal block (SSB), channel state information reference signal (CSI-RS), or positioning reference signal (PRS).

26. The non-transitory computer-readable medium of claim 23, wherein the one or more factors on which the number of samples is based depends on a type of the PL RS, wherein the type of PL RS is based on a reference signal source of the PL RS, wherein the reference signal source is one of a serving cell or a non-serving cell of the UE.

27. The non-transitory computer-readable medium of claim 23, wherein the one or more factors comprise whether, in a time window prior to receiving the indication, the UE measured previous samples of the PL RS at least for a threshold duration or a threshold number of samples, wherein the number of samples is less when the UE has measured previous samples of the PL RS for the threshold duration or the threshold number of samples as compared to when the UE has not measured previous samples of the PL RS for the threshold duration or the threshold number of samples.

28. The non-transitory computer-readable medium of claim 23, wherein the one or more factors comprise whether, in a time window prior to receiving the indication, the UE received a previous indication to activate the PL RS, wherein the number of samples is less when the UE received the previous indication to activate the PL RS as compared to when the UE has not received the previous indication to activate the PL RS.

29. The non-transitory computer-readable medium of claim 23, wherein the one or more factors comprise a variance in signal strength between the measured samples, wherein the number of samples is less when the variance in signal strength is smaller as compared to when the variance in signal strength is larger.

30. The non-transitory computer-readable medium of claim 23, wherein the one or more factors comprise a variance in signal strength between the measured samples, wherein the number of samples is a first value when the variance in signal strength between the measured samples over a second number of samples less than the first value is greater than a threshold variance, and the number of samples is the second number of samples when the variance in signal strength between the measured samples over the second number of samples is less than the threshold variance.

* * * * *